(12) United States Patent
Sim et al.

(10) Patent No.: US 9,147,341 B2
(45) Date of Patent: Sep. 29, 2015

(54) DEVICE FOR AUTOMATICALLY READING A GLOW TUBE

(71) Applicants: Harry Sim, San Jose, CA (US); Robert Shaw, Escondido, CA (US); Steve Kim, Campbell, CA (US)

(72) Inventors: Harry Sim, San Jose, CA (US); Robert Shaw, Escondido, CA (US); Steve Kim, Campbell, CA (US)

(73) Assignee: CYPRESS ENVIROSYSTEMS, San Jose, CA (US)

( * ) Notice: Subject to any disclaimer, the term of this patent is extended or adjusted under 35 U.S.C. 154(b) by 0 days.

(21) Appl. No.: 14/311,010

(22) Filed: Jun. 20, 2014

(65) Prior Publication Data

US 2015/0061887 A1    Mar. 5, 2015

Related U.S. Application Data

(60) Provisional application No. 61/871,932, filed on Aug. 30, 2013.

(51) Int. Cl.
*G08C 17/02* (2006.01)

(52) U.S. Cl.
CPC ..................................... *G08C 17/02* (2013.01)

(58) Field of Classification Search
CPC .............. H01J 40/14; G05F 1/42; G08C 17/02
USPC .......... 250/206.1, 214 R; 340/870.02, 870.29; 73/866.1, 866.3; 382/100; 348/160
See application file for complete search history.

(56) References Cited

U.S. PATENT DOCUMENTS

| | | | |
|---|---|---|---|
| 8,829,412 B1* | 9/2014 | Papson | 250/214 R |
| 2008/0148877 A1* | 6/2008 | Sim | 73/866.1 |
| 2009/0034788 A1* | 2/2009 | Sim et al. | 382/100 |
| 2009/0183584 A1* | 7/2009 | Valoff et al. | 73/866.3 |
| 2009/0190795 A1* | 7/2009 | Derkalousdian et al. | 382/100 |

* cited by examiner

*Primary Examiner* — Albert Wong
(74) *Attorney, Agent, or Firm* — Manuel F. de la Cerra

(57) ABSTRACT

The disclosure provides a wireless gauge reader system for use on an existing electrical substation where the substation has a window through which at least one glow tube is visible. The system includes a frame fastened to the substation that surrounds at least a portion of the window, and a door in connection with the frame that allows the door to open and close. The door includes a wireless gauge reader (WGR) that has an optical sensor that is positioned to view the glow tube when the door is closed. The WGR also has a transmitter to transmit a wireless signal based on the illumination state of the glow tube. Various aspects of the connection of the door to the frame are disclosed.

20 Claims, 7 Drawing Sheets

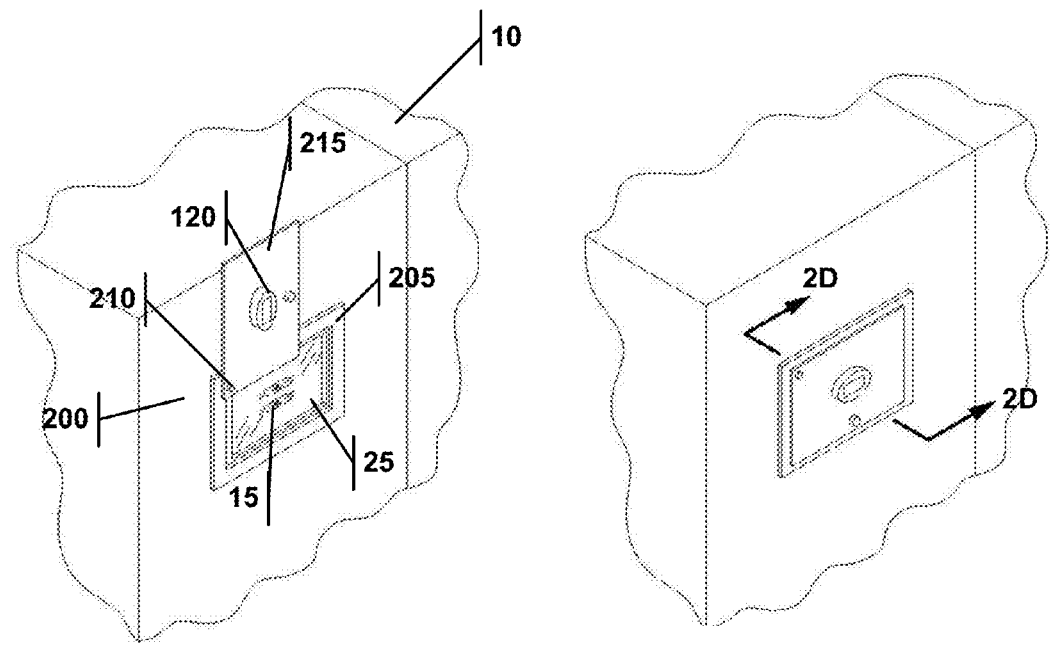
FIG. 2A
FIG. 2B
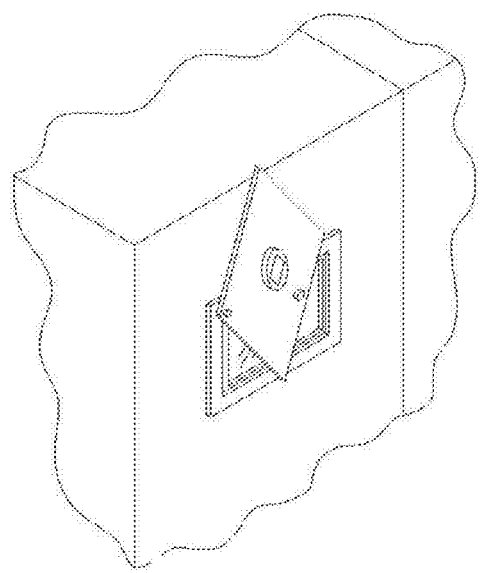
FIG. 2C
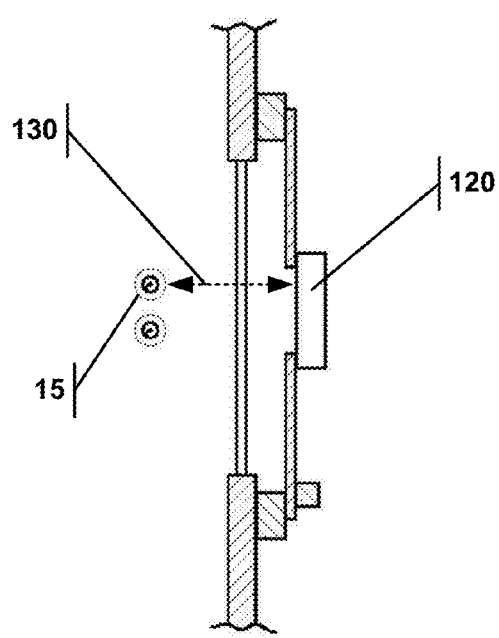
FIG. 2D

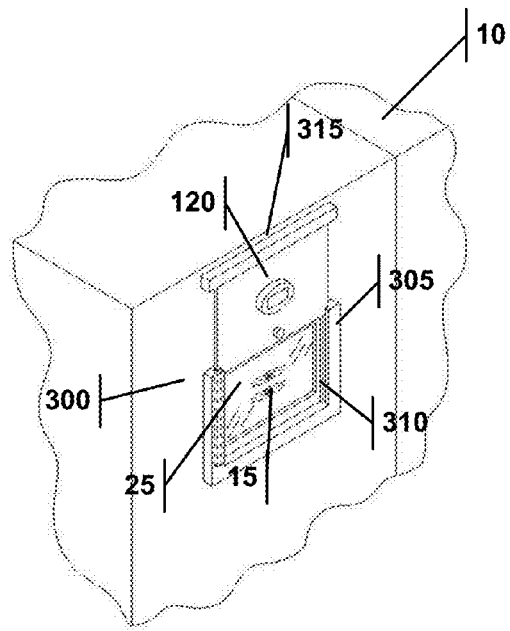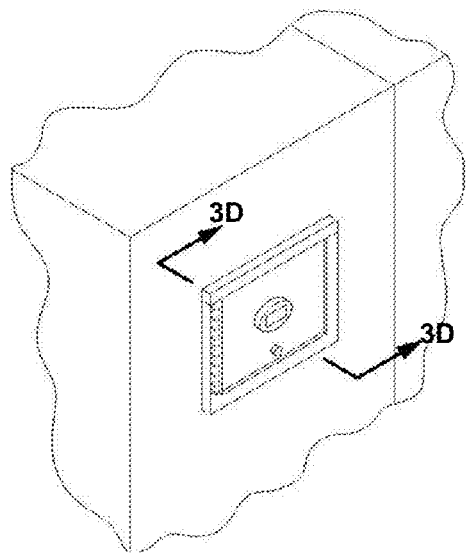
FIG. 3A  FIG. 3B
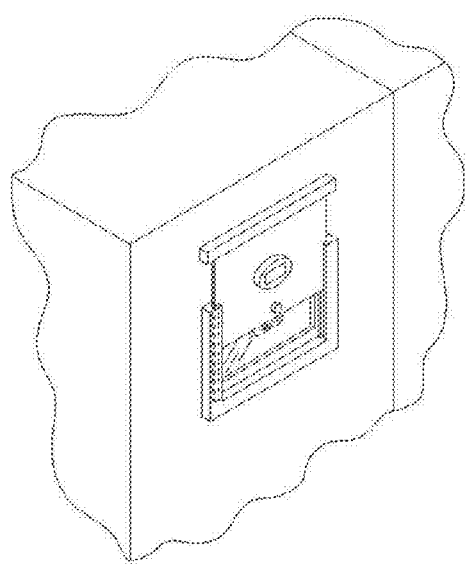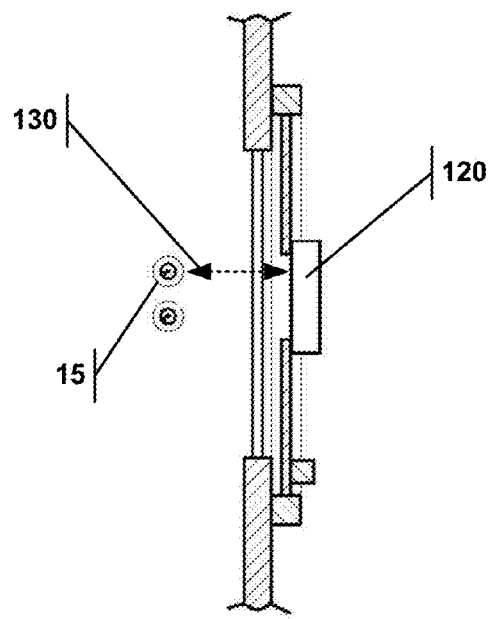
FIG. 3C  FIG. 3D

DEVICE FOR AUTOMATICALLY READING A GLOW TUBE

RELATED APPLICATIONS

This application is the non-provisional of U.S. Patent Application No. 61/871,932 filed on Aug. 30, 2013. That application is incorporated herein by reference.

TECHNICAL FIELD

The present disclosure relates to devices and methods for automatically reading a gauge and transmitting that reading.

BACKGROUND

Industrial and other facilities may include monitor and/or control devices, such as gauges or glow tubes to track parts of processes or systems. Readings from such devices are periodically taken to ensure such processes/systems are operating as desired. This can consume considerable time and manpower.

Systems may be upgraded by replacing an entire device (e.g., gauge or glow tube) with a replacement device having a built in transmitting capability. A drawback to such an approach is that replacement of an entire gauge can be invasive. In the event the gauge is utilized in an active process, the process may have to be shut down entirely while the gauge is replaced with a transmitting unit. Further, once a transmitting unit is installed, such a unit may have to be independently tested to ensure it is transmitting a correct signal. In addition, a transmitting unit may require wiring from the transmitter to a central location. This can require additional labor, and assumes suitable wiring paths are available at the site.

Even overcoming these deficiencies, the replacement of the device may not be desirable, however. The operators of the facility often like to keep their equipment in as an original state as possible because they have several years of training and familiarity with the equipment.

What is therefore needed is a retrofit device that maintains the original device, while allowing automatic readings to be transmitted and the operators to independently read the device to confirm the operational status of the equipment.

SUMMARY

The present invention provides an elegant solution to the needs described above and provides numerous additional benefits and advantages as will be apparent to persons of skill in the art. One aspect provides a wireless gauge reader system for use on an existing electrical substation where the substation has a window through which at least one glow tube is visible. The system includes a frame fastened to the substation, and a door in connection with the frame that allows the door to open and close. The door includes a wireless gauge reader (WGR) that has an optical sensor that is positioned to view the glow tube when the door is closed. The WGR also has a transmitter to transmit a wireless signal based on the illumination state of the glow tube.

In one embodiment, the connection of the door to the frame includes at least one channel on the frame and the door is disposed of at least partially in the channel and adapted to slide along the channel. In another embodiment this connection includes at least one channel on the door and the frame is disposed of at least partially in the channel and the door is adapted to slide along the frame. In yet another embodiment the connection is a hinge connected to the frame and the door, and the door is adapted to rotate about the hinge. And in yet another embodiment, the connection is a pivot connecting the frame to the door, and the door is adapted to rotate about the pivot.

The door may be constructed so as to block a portion of light from entering the window when the door is closed. The door may also block glare that would otherwise interfere with taking an accurate reading of the glow tube. The alignment of the WGR to the glow tube is maintained when the door is opened and then closed, and it is also maintained when the WGR is removed and replaced.

The system may also include a wireless receiver that receives the wireless signal from the WGR, and that receiver may be connected to a network and adapted to report the illumination status of the glow tube over the network. That network may be a cellular network, a public network or a private network.

The WGR may also have a field of view that includes more than one glow tube, and the wireless signal is based on the illumination state of the multiple glow tubes. The door may include a second WGR. The frame of the system may be mounted to the substation by a variety of fasteners, including but not limited to, screws, bolts, rivets, adhesives, magnets, suction cups or hook-and-loop fasteners. The WGR may also include a processor connected to the optical sensor that processes an image of the glow tube captured by the optical sensor.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. It will be understood that certain components and details may not appear in the figures to assist in more clearly describing the invention.

FIG. 2A illustrates a second embodiment of a wireless gauge reader system that includes a door, where the door is opened and connected to a frame by a pivot.

FIG. 2B illustrates the embodiment of FIG. 2A, where the door is closed.

FIG. 2C illustrates the embodiment of FIG. 2A, where the door is partially opened.

FIG. 2D illustrates the embodiment of FIG. 2A, in a cross-section along line 2D-2D.

FIG. 3A illustrates a third embodiment of a wireless gauge reader system that includes a door, where the door is opened and travels along a channel contained in the frame.

FIG. 3B illustrates the embodiment of FIG. 3A, where the door is closed.

FIG. 3C illustrates the embodiment of FIG. 3A, where the door is partially opened.

FIG. 3D illustrates the embodiment of FIG. 3A, in a cross-section along line 3D-3D.

DETAILED DESCRIPTION OF EXAMPLE EMBODIMENTS

Following is a non-limiting written description of example embodiments illustrating various aspects of the invention. These examples are provided to enable a person of ordinary skill in the art to practice the full scope of the invention without having to engage in an undue amount of experimentation. As will be apparent to persons skilled in the art, further modifications and adaptations can be made without departing from the spirit and scope of the invention, which is limited only by the claims.

In the following description, numerous specific details are set forth in order to provide a thorough understanding of the present invention. Particular example embodiments of the present invention may be implemented without some or all of these features or specific details. In other instances, components well known to persons of skill in the art have not been described in detail in order not to obscure unnecessarily the present invention.

Figure 8:
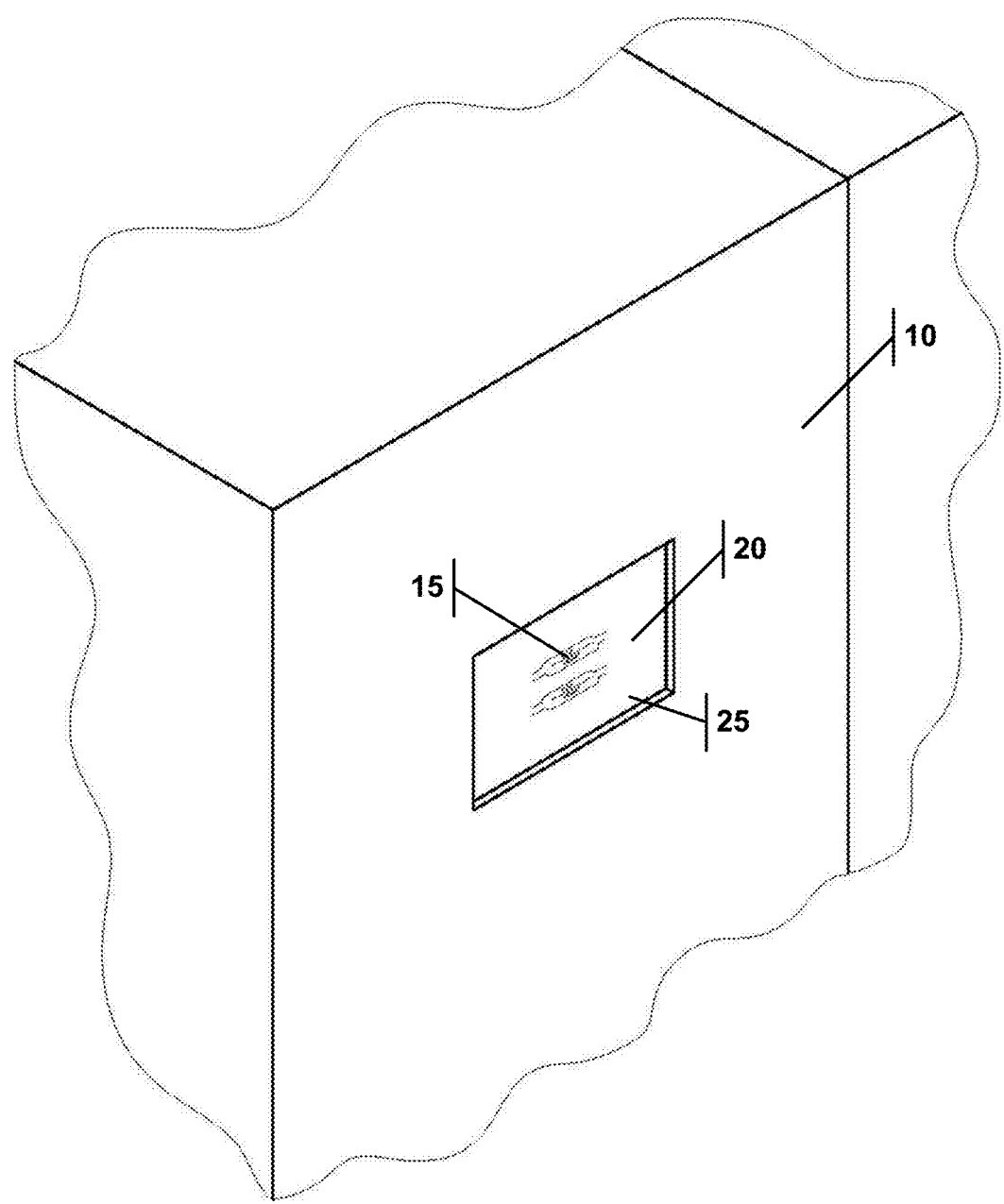
FIG. 8 shows a piece of equipment with a glow tube within a glow tub compartment that may be viewed through a window.

FIG. 8 illustrates a power substation 10 that has a glow tube 15 within a compartment 20, and a window 25 that allows the operator of the power substation 10 to view the glow tube 15. When the glow tube 15 is illuminated, this signifies that the power substation circuit is live with current. Sometimes when the power substation power supply is shut off, there is back feed from downstream generators which can maintain live current in the circuit. The glow tube 15, therefore is a safety device that indicates to the operator the status of the circuit. The glow tube 15, however, may not illuminate very brightly, so the operator may need to cup his hands around the window 25, to block out light and glare, so as to more vividly see the illumination of the glow tube 15.

The four wireless gauge reader system embodiments detailed below, can be easily mounted to an existing power substation 10 with little installation effort. The retrofit does not require modification (or perhaps minimal modification) of the original equipment, while still allowing the operator to view the glow tubes 15 easily without affecting the efficacy of the wireless gauge reader system.

Turning now to FIGS. 1A-1D, a first embodiment of an automatic glow tube wireless gauge reader system 100 is shown. The wireless gauge reader system 100 contains a frame 105 that is mounted to power substation 10. The frame 105 may completely circumscribe the window 25, but that is not necessary. Connected to the frame 105 is a hinge 110 that is also connected to a door 115. A wireless gauge reader (WGR) 120 is connected to the door 115, where the WGR 120 has an optical sensor and a wireless transmitter adapted to transmit a signal to a server/network (see FIGS. 6 and 7). A handle 128 may also be connected to the door 115 to allow the operator to swing the door 115 out of the way of the window 25 to view the glow tube 15. Also included in the wireless gauge reader system 100 may be an indicator 127 that may indicate the current state of the glow tube 15. For example, the indicator 127 may be a multi-colored LED that flashes one color when the glow tube 15 is on and another when the glow tube 15 is off. The indicator 127 may be an LCD readout. The wireless gauge reader system 100 may also have an actuation button 129 that causes the wireless gauge reader system 100 to immediately take a reading of the glow tube 15, which in turn may indicate the status of the glow tube 15 on the indicator 127. The operator, therefore, can press the button 129 to verify the operational status of the wireless gauge reader system 100 by comparing the indicator 127 to what the operator actually views by looking through the window 25 at the glow tube 15, when the operator swings the door 115.

Figure 1A:
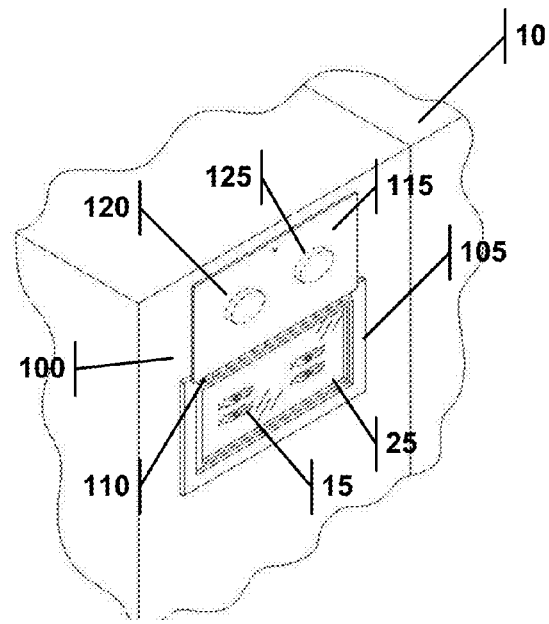
FIG. 1A illustrates a first embodiment of a wireless gauge reader system that includes a door, where the door is opened and connected to a frame by a hinge.
Figure 1B:
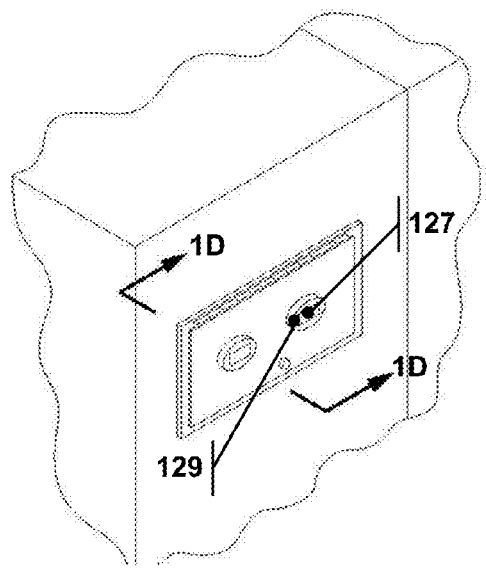
FIG. 1B illustrates the embodiment of FIG. 1A, where the door is closed.
Figure 1C:
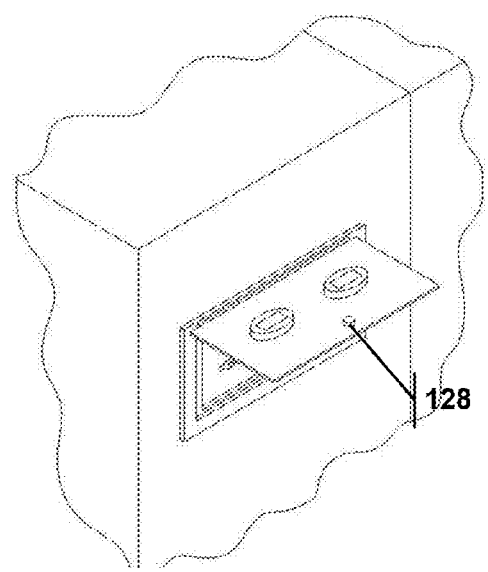
FIG. 1C illustrates the embodiment of FIG. 1A, where the door is partially opened.

Turning now to FIGS. 1A-1D, a first embodiment of an automatic glow tube wireless gauge reader The signal transmitted from the WGR 120 to the server/network may include, for example, an image of the glow tube 15, which is then processed by the server/network to determine whether the glow tube 15 is illuminated. The signal may also be a report regarding the illumination state of the glow tube 15; in other words, the processing may be done in the WGR 120 with the results of that processing provided to the server/network. The optical sensor may detect the visible or infrared spectrum of light. The WGR 120 may also have a battery. If the power substation has additional glow tubes, the door 115 may have a multiple WGRs 125. Alternatively, the WGR 120 may have a larger field of view to detect more than one glow tube and transmit the sensed data (as shown in FIG. 1A where WGR 120 views two glow tubes). FIG. 1A shows a wireless gauge reader system 100, where the door 115 is opened, while FIG. 1B shows the door 115 closed and in FIG. 1C, the door 115 is transitioning.

Figure 1D:
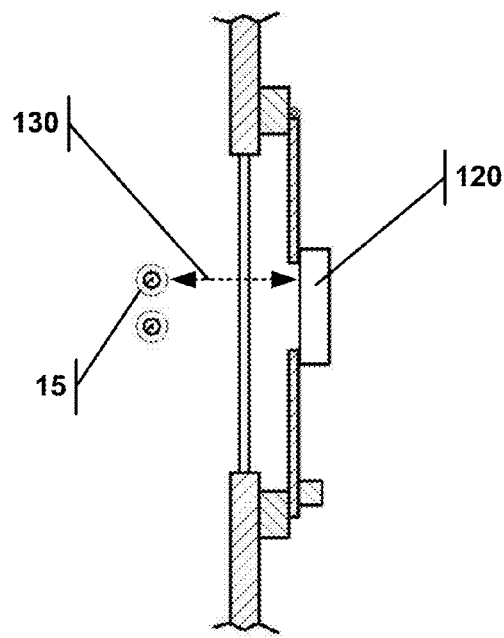
FIG. 1D illustrates the embodiment of FIG. 1A, in a cross-section along line 1D-1D.

FIG. 1D is a cross-sectional view of the wireless gauge reader system 100 taken along line 1D-1D of FIG. 1B. This illustrates that when the door 115 is closed, the WGR 120 is at a position relative 130 to the glow tube 15. When the door 115 is swung open the WGR 120 moves from this relative position, but returns to that position when the door 115 is closed. It is advantageous to have the WGR 120 return to its initial position (i.e., the position when the door is closed) because the wireless gauge reader system 100 can be calibrated when it is initially installed and thereafter, when an operator swings the door 115 to independently view the glow tube 15, the WGR 120 will not fall out of calibration. Likewise, when multiple WGRs (120, 125) are used, the swinging of the door would return the WGRs (120, 125) to their initial calibrated position.

The door 115 not only acts to maintain the initial calibration position of the WGR 120, it also acts to block a portion of light from entering the window 25 when the door is closed. The door 115 also blocks glare that the optical sensor on the WGR 120 would experience. This "dark room" effect allows the optical sensor on the WGR 120 to operate more effectively and efficiently without interfering light pollution. And because the WGR 120 is operating in an ideal low light environment, it can capture and process the image of the glow tube 15 with very little computational power—resulting in cheaper manufacturing and operational costs. The low processing of the WGR 120 is ideal for battery operation because of the low power requirements.

Figure 5:
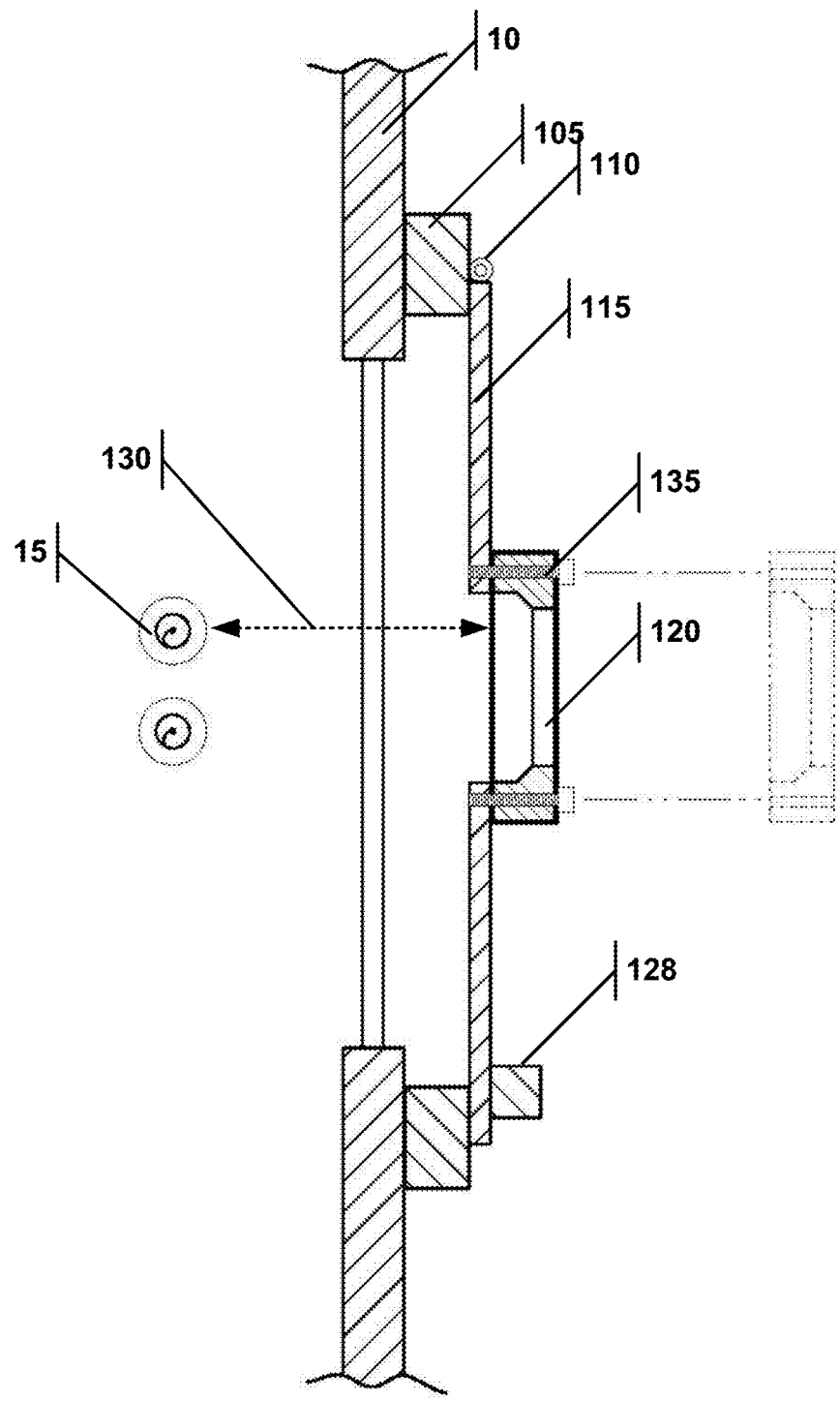
FIG. 5 illustrates the removal and re-installation of a wireless gauge reader.

FIG. 5 illustrates the detachable mount 135 of the WGR 120 to the door 115. This is helpful when the WGR 120 must be replaced or repaired—e.g., to replace the battery. When returning the WGR 120 (either the original or a replacement), the optical sensor of the WGR 120 is maintained in the same relative position to the glow tube 15, again preserving calibration.

FIGS. 2A-2D illustrate a second embodiment of an automatic glow tube wireless gauge reader system 200. The wireless gauge reader system 200 contains a frame 205 that is mounted to power substation 10. The frame 205 may completely circumscribe the window 25, but that is not necessary. Connected to the frame 205 is a pivot 210 that is also connected to a door 215. A wireless gauge reader (WGR) 120 is connected to the door 215, where the WGR 120 has optical sensor and a wireless transmitter adapted to transmit sensed data to a server/network (see FIGS. 5 and 6). If the power substation has additional glow tubes, the door 215 may have a multiple WGRs or a single WGR with an appropriate field of view. FIG. 2A shows a wireless gauge reader system 200 where the door 215 is opened, while FIG. 2B shows the door 215 closed and in FIG. 2C the door 215 is transitioning.

As with the embodiment discussed above with reference to FIGS. 1A-1D, the pivot 210 allows an operator to swing the door 215 open to independently view the glow tube 15, and when the door 215 is thereafter closed, the WGR 120 returns to its initial calibrated position. This is shown in greater detail in FIG. 2D that is a cross-sectional view of the wireless gauge reader system 200 taken along line 2D-2D of FIG. 2B.

A third embodiment of an automatic glow tube wireless gauge reader system 300 is shown in FIGS. 3A-3D. This system 300 contains a frame 305 that is mounted to power substation 10. The frame 305 may contain a channel 310, into which a door 315 may slide. A wireless gauge reader (WGR) 120 (or multiple WGRs) is connected to the door 315. FIG. 3A shows a wireless gauge reader system 300 where the door 315 is opened, while FIG. 3B shows the door 315 closed and in FIG. 3C the door 315 is transitioning.

As with the embodiment discussed above, FIG. 3D illustrates a cross-sectional view of the wireless gauge reader system 300 taken along line 3D-3D of FIG. 3B. The channel 310 allows an operator to slide the door 315 open to independently view the glow tube 15, and when the door 315 is thereafter closed, the WGR 120 returns to its initial calibrated position.

Figure 4A:
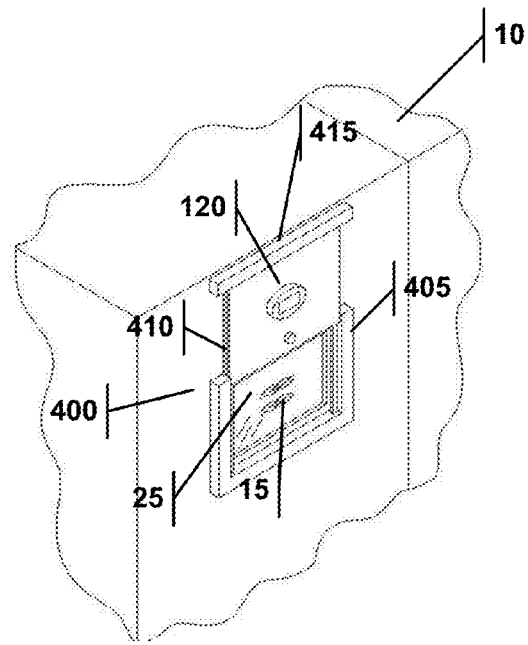
FIG. 4A illustrates a fourth embodiment of a wireless gauge reader system that includes a door, where the door is opened and contains a channel into which a frame is disposed, where the door slides along the frame.
Figure 4B:
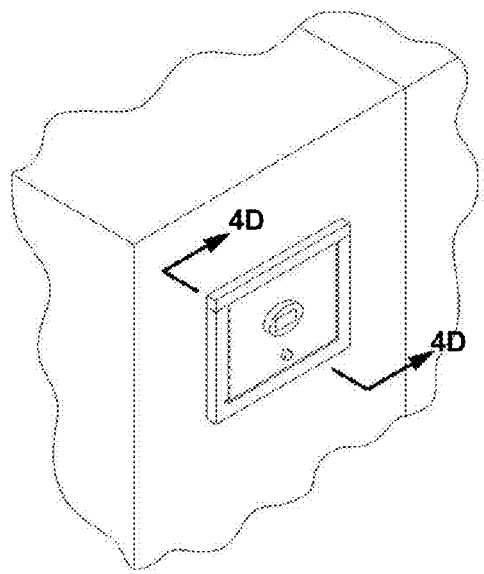
FIG. 4B illustrates the embodiment of FIG. 4A, where the door is closed.
Figure 4C:
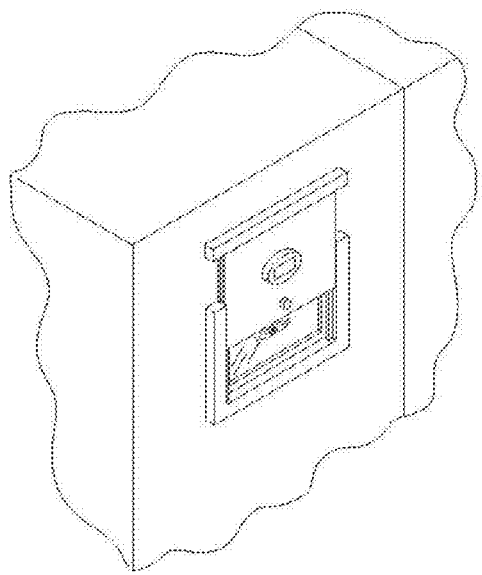
FIG. 4C illustrates the embodiment of FIG. 4A, where the door is partially opened.
Figure 4D:
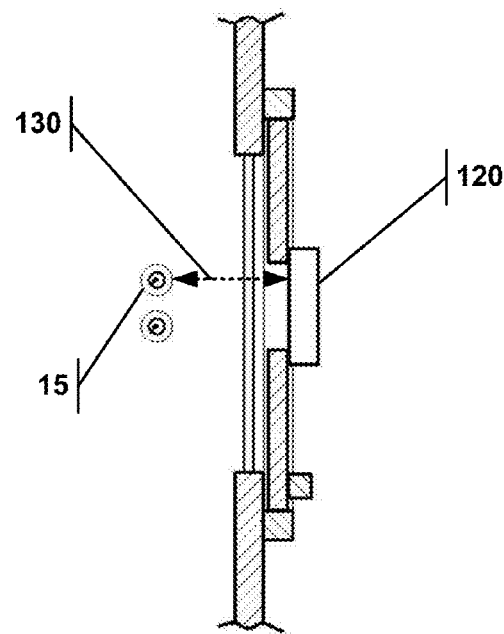
FIG. 4D illustrates the embodiment of FIG. 4A, in a cross-section along line 4D-4D.

Similar to the third embodiment, the fourth embodiment also uses a sliding door. Specifically, FIGS. 4A-4D show an automatic glow tube wireless gauge reader system 400 that includes a frame 405 mounted to power substation 10. The door 415 contains a channel 410 into which the frame 405 may slide. A wireless gauge reader (WGR) 120 (or multiple WGRs) is connected to the door 415. FIG. 4A shows a wireless gauge reader system 400 where the door 415 is opened, while FIG. 4B shows the door 415 closed and in FIG. 4C the door 415 is transitioning. The channel 410 allows an operator to slide the door 415 open to independently view the glow tube 15, and when the door 415 is thereafter closed, the WGR 120 returns to its initial calibrated position.

The frame (105, 205, 305, 405) may be fastened to the power substation 10 by any suitable means. For example, screws or rivets may be used. Non-intrusive fastening such as high strength adhesives, magnets, suction cups or hook-and-loop fasteners may be preferable because they can be applied easily and do not require screws or bolts to be lagged into the power substation 10, which may be dangerous.

Figure 6:
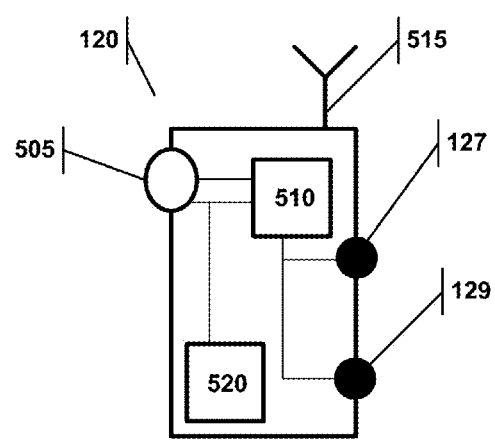
FIG. 6 illustrates a wireless gauge reader for use in the above embodiments.

FIG. 6 illustrates the components of the WGR 120. An optical sensor 505 is connected to a processor 510 that is connected to a transmitter 515. The WGR 120 also includes a power source 520. The transmitter 515 may be wireless and the power source 520 may be a battery. The indicator 127 is also connected to the processor 510, as is the actuator button 129. When multiple WGRs are used on a particular wireless gauge reader system door, the system may be simplified by having a single transmitter. The processor 510 may process the data taken from the optical sensor 505, such that the transmitter 515 transmits a signal that includes an image of the glow tube 15, which is then processed by the server/network to determine whether the glow tube 15 is illuminated. The processor 510 may also process the data from the optical sensor 505, such that the transmitter 515 transmits a signal that includes the illumination state of the glow tube 15—i.e., the results of that processing are provided to the server/network. The transmitting can be made on demand, at specific intervals, and through a custom interface that is operated by the substation operator. Likewise the sampling of the image of the glow tube by the WGR may be done on-demand or at specific intervals or on a predetermined schedule. The system described herein can be used with any electrical system that uses glow tubes to indicate the presence of high voltage in a circuit.

Figure 7:
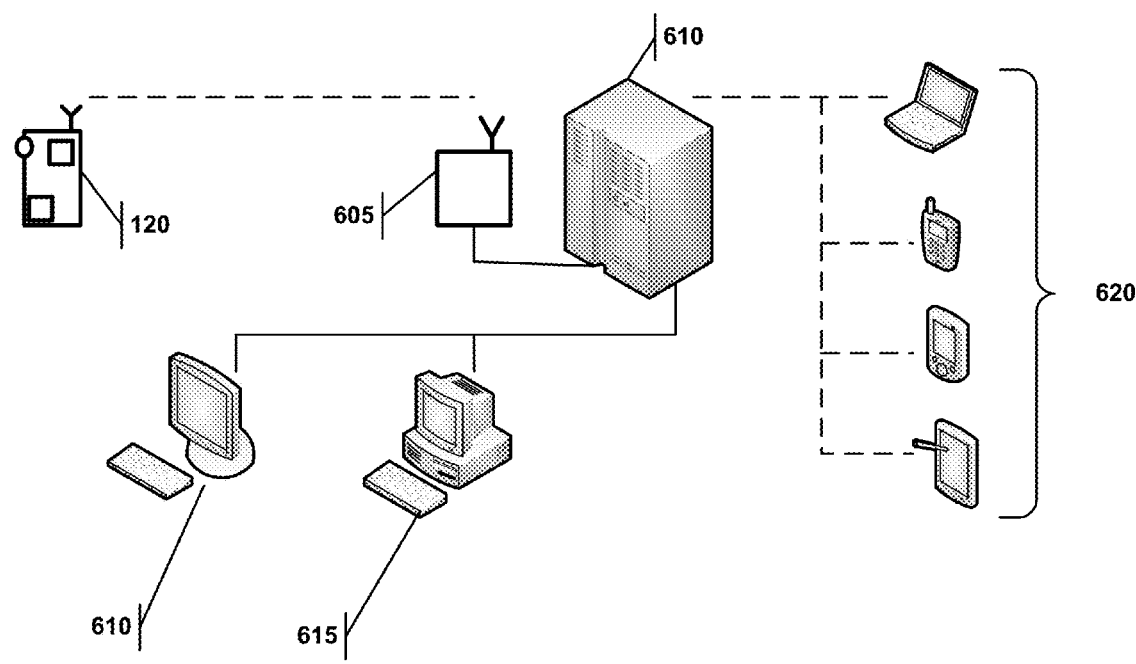
FIG. 7 illustrates the wireless gauge reader system transmitting information wirelessly to a network.

The transmitter 515 of the WGR 120 can transmit its data to a central receiver 605 as shown in FIG. 7. That receiver 605 may then be connected to a network 610, which may be a public or private network. This configuration would then allow an operator of the system to view the status of its power substations on a computer in his office (610, 615), or on a mobile computing device (620) out on the field. The network may include, but is not limited to, wired (shown as solid lines in FIG. 7) and wireless connections (shown as dashed lines), and can further include cellular, LAN, WAN and virtual networks.

A basic algorithm for detecting the illuminations state of the glow tube may be as follows. Upon installation/calibration, with the door closed and the glow tube known to be on, the wireless gauge reader system scans the image from the optical sensor to determine the brightest pixels and forms a line of pixels that would be down the center of the glow tube. When reading the glow tube, the wireless gauge reader system computes an image dark level by averaging every Nth pixel detected by the optical sensor. For each pixel of interest (i.e., a line of pixels down substantially the center of the glow tube) the system will: (1) perform an infinite impulse response filter with the feedback coefficient set at $\frac{1}{4}^{th}$ to smooth out the line of pixels; (2) with each filtered pixel of interest, determine the minimum and maximum brightness pixels; (3) count all filtered pixels that are greater than the dark level average; and (4) sum all filtered pixels that are greater than the dark level average. If the maximum and minimum values exceed a predetermined threshold and the sum exceeds a predetermined value then the pixel line (i.e., the glow tube) is considered on. As detailed above, this processing may be performed by the WGR and the WGR may simply report the result—on or off. The WGR may also send an image of the glow tube to the central receiver/network which then performs the processing. The processing duties may also be shared between the WGR and the central receiver/network.

The invention has been described in connection with specific embodiments that illustrate examples of the invention but do not limit its scope. Various example systems have been shown and described having various aspects and elements. Unless indicated otherwise, any feature, aspect or element of any of these systems may be removed from, added to, combined with or modified by any other feature, aspect or element of any of the systems. As will be apparent to persons skilled in the art, modifications and adaptations to the above-described systems and methods can be made without departing from the spirit and scope of the invention, which is defined only by the following claims. Moreover, the applicant expressly does not intend that the following claims "and the embodiments in the specification to be strictly coextensive." *Phillips v. AHW Corp.*, 415 F.3d 1303, 1323 (Fed. Cir. 2005) (en banc).

The invention claimed is:

1. A wireless gauge reader system for use on an existing electrical substation, the substation comprising a window through which at least one glow tube is visible, the glow tube illuminating depending on the status of the electrical substation, the wireless gauge reader system comprising:
   a frame fastened to the substation;
   a door in connection with the frame, the connection allowing the door to open and close, the door comprising a wireless gauge reader (WGR), the WGR comprising an optical sensor connected to a wireless transmitter, wherein the optical sensor is positioned to view the glow tube when the door is closed and adapted to transmit a wireless signal based on the illumination state of the at least one glow tube; the WGR further comprising a processor in communication with the optical sensor, wherein the processor determines the illumination state of the at least one glow tube by executing instructions comprising:
   averaging every Nth pixel detected by the optical sensor to compute a dark level average;
   performing a filter to smooth a line of pixels substantially centered along the glow tube;
   determining a minimum and a maximum brightness value in the line of pixels;
   counting and summing all pixels with a brightness greater that the dark level average; and
   determining that the at least one glow tube is on when the brightness values exceed a predetermined threshold and the summation exceeds a predetermined value.

2. The system of claim 1, wherein the connection of the door to the frame is adapted to allow a user to view the at least one glow tube when the door is opened.

3. The system of claim 1, wherein the connection of the door to the frame comprises at least one channel on the frame and the door is disposed of at least partially in the channel and adapted to slide along the channel.

4. The system of claim 1, wherein the connection of the door to the frame comprises at least one channel on the door and the frame is disposed of at least partially in the channel and the door is adapted to slide along the frame.

5. The system of claim 1, wherein the connection of the door to the frame comprises a hinge connected to the frame and the door, and the door is adapted to rotate about the hinge.

6. The system of claim 1, wherein the connection of the door to the frame comprises a pivot connecting the frame to the door, and the door is adapted to rotate about the pivot.

7. The system of claim 1, wherein the door is constructed so as to block a portion of light from entering the window when the door is closed.

8. The system of claim 1, wherein the door is constructed so as to block glare from ambient that may be detected by the optical sensor.

9. The system of claim 1, wherein when the door is closed the optical sensor is at a position relative to the least one glow tube, and when the door is opened and then closed, the optical sensor returns to substantially the same position.

10. The system of claim 1, wherein when the door is closed the optical sensor is at a position relative to the least one glow tube, and wherein the WGR is detachably connected to the door such that when the WGR is removed and a new WGR is installed in its place, or the original WGR is re-installed, the optical sensor returns to substantially the same position when door is closed.

11. The system of claim 1, further comprising:
   a wireless receiver adapted to receive the wireless signal wherein the receiver is connected to a network and adapted to report the illumination status of the at least one glow tube over the network.

12. The system of claim 10, wherein the network a cellular network, a public network or a private network.

13. The system of claim 1, wherein the door comprises a second wireless gauge reader (2nd WGR), the 2nd WGR comprising a second optical sensor connected to a second wireless transmitter, wherein the second optical sensor is positioned to view a second glow tube when the door is closed and adapted to transmit a second wireless signal based on the illumination state of the second glow tube.

14. The system of claim 13, wherein the transmitter and second transmitter comprise a single transmitter.

15. The system of claim 1, wherein the frame is fastened to the substation by a fastener selected from a group consisting of: screws, bolts, rivets, adhesives, magnets, suction cups or hook-and-loop fasteners.

16. The system of claim 1, wherein the wireless signal comprises data from the processor.

17. The system of claim 1, wherein the wireless signal comprises an image of the at least one glow tube captured by the optical sensor.

18. The system of claim 1, wherein the optical sensor has a field of view that includes the at least one glow tube and a second glow tube, and the wireless signal is based on the illumination state of the second glow tube.

19. The system of claim 1, further comprising an indicator that indicates the illumination state of the at least one glow tube.

20. The system of claim 1, further comprising an actuation button that causes the WGR to determine the illumination state of the at least one glow tube.

* * * * *